Figure 1:
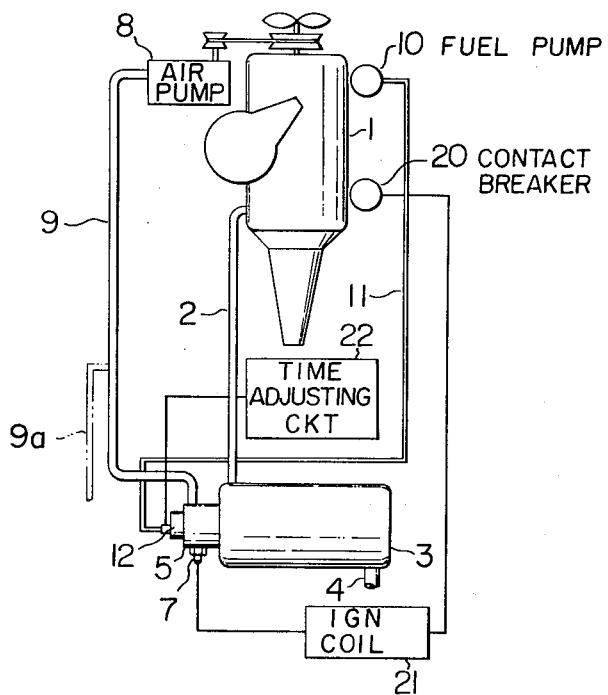

United States Patent [19]
Tanasawa et al.

[11] 3,724,220
[45] Apr. 3, 1973

[54] EXHAUST GAS PURIFYING DEVICE FOR INTERNAL COMBUSTION ENGINES

[75] Inventors: Yasusi Tanasawa, Nagoya; Tokuta Inoue, Sizuoka-ken; Kenji Ishiguro, Aichi-ken; Tokio Kohama, Nishio, all of Japan

[73] Assignees: Nippondenso Co., Ltd., Aichi-ken; Toyota Jidosha Kogyo Kabushiki Kaisha, Toyota-shi; Kabushiki Kaisha Toyota Chuo Kenkyusho, Aichi-ken, all of Japan

[22] Filed: Oct. 26, 1971

[21] Appl. No.: 192,089

[30] Foreign Application Priority Data

| Nov. 4, 1970 | Japan | 45/97022 |
| Nov. 4, 1970 | Japan | 45/97023 |
| Nov. 4, 1970 | Japan | 45/97024 |

[52] U.S. Cl....................................60/303, 23/277 C
[51] Int. Cl..................................................F01n 3/14
[58] Field of Search...60/303, 286, 39.74 R, 39.82 P; 23/277 C

[56] References Cited

UNITED STATES PATENTS

| 2,918,118 | 12/1959 | Schirmer | 60/39.74 R |
| 2,922,279 | 1/1960 | Roberson | 60/39.74 R |
| 3,311,456 | 3/1967 | Denny | 23/277 C |
| 3,360,927 | 1/1968 | Cornelius | 60/286 |

*Primary Examiner*—Douglas Hart
*Attorney*—Cushman, Darby & Cushman

[57] ABSTRACT

An exhaust gas purifying device for burning the unburnt component contained in the exhaust gas of an internal combustion engine. A swirl of air is formed in a combustion chamber, fuel is supplied into the combustion chamber and burnt, and a combustion flame swirling in the combustion chamber is blown into a reaction chamber disposed in an exhaust pipe of the internal combustion engine. A porous member made of noncombustible material is mounted to an opening of a fuel spouting pipe opened into the combustion chamber.

11 Claims, 7 Drawing Figures

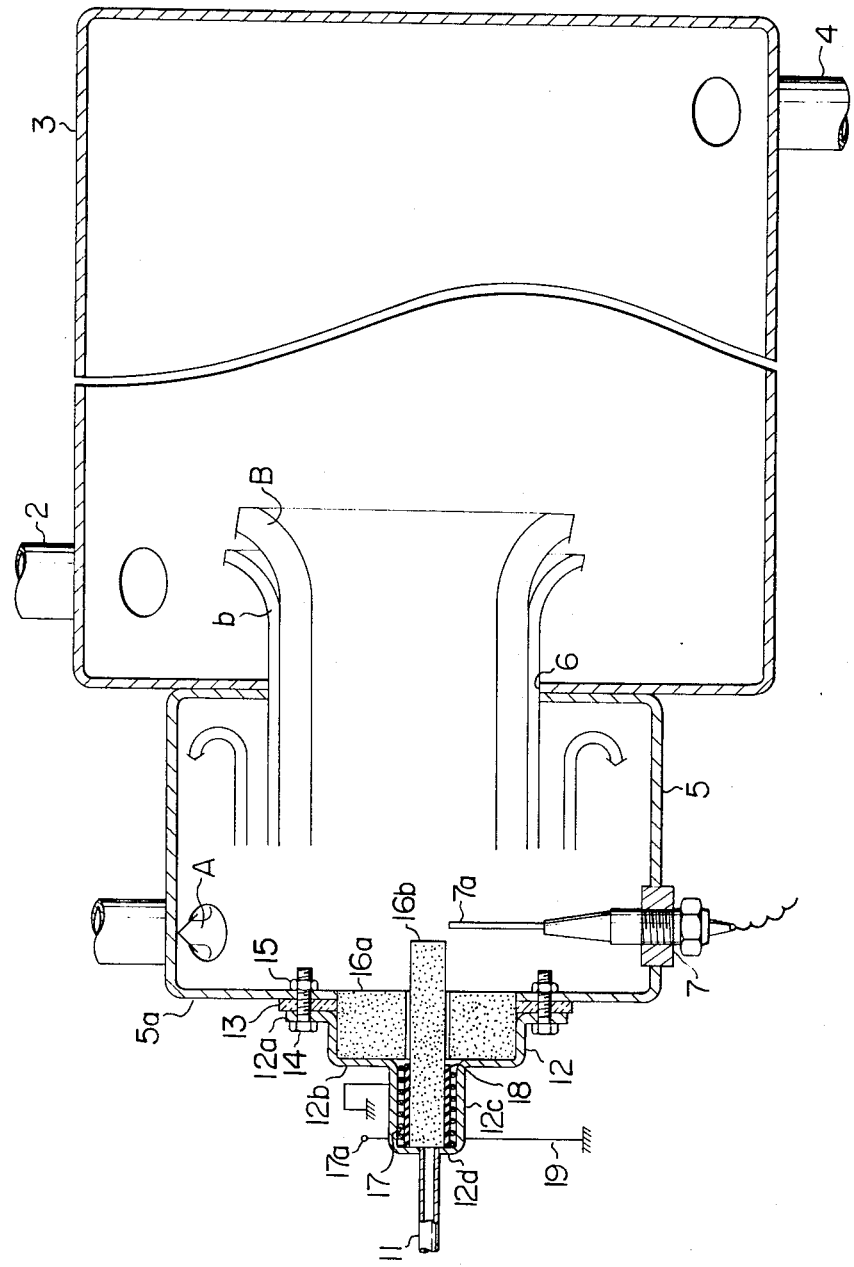

EXHAUST GAS PURIFYING DEVICE FOR INTERNAL COMBUSTION ENGINES

The present invention relates to an exhaust gas purifying device for an internal combustion engine of spiral combustion chamber type which burns and purifies unburnt harmful gas components such as carbon monoxide and hydrocarbon in the exhaust gas of an internal combustion engine used as a prime mover in an automobile.

An object of the present invention is to provide an exhaust gas purifying device for an internal combustion engine in which a swirl of air is made in a combustion chamber, fuel is supplied into the combustion chamber, and the unburnt harmful component of the exhaust gas flowing into a reaction chamber is burned again by making a swirling combustion flame blow off into the reaction chamber provided in an exhaust pipe of the internal combustion engine, wherein a porous member made of noncombustible material is mounted to a fuel ejecting port opened to the combustion chamber, whereby the fuel may efficiently be vaporized from the surface of the porous member and the combustion in the combustion chamber is accelerated to sufficiently purify the exhaust gas.

Another object of the present invention is to provide an exhaust gas purifying device for an internal combustion engine as described above in which a check valve and a volume chamber having a prescribed volume are disposed in a conduit which introduces air from an air source to the combustion chamber with the check valve located nearer the air source, whereby the air remaining in the volume chamber after stoppage of the engine is kept on being supplied to the combustion chamber to completely burn the fuel remaining in the porous member and prevent the air pollution.

Still another object of the present invention is to provide an exhaust gas purifying device for an internal combustion engine in which means is provided for preventing the exhaust gas in the reaction chamber from flowing into the combustion chamber, whereby the combustion is carried out in the combustion chamber in good condition at any state of the engine so as to realize a perfect purification of the exhaust gas and contributes greatly to prevention of the air pollution.

A further object of the present invention is to provide an exhaust gas purifying device for an internal combustion engine in which the foregoing air flow preventing means is composed of means for making air eject into the reaction chamber through the central portion of the swirling air flow in the combustion chamber, whereby the exhaust gas is prevented from flowing into the reaction chamber and the object equivalent to the foregoing first object is accomplished.

A still further object of the present invention is to provide an exhaust gas purifying device for an internal combustion engine in which the foregoing air flow preventing means is composed of a blocking wall member having a required minimum size of opening to let the combustion flame blow into the reaction chamber from the combustion chamber disposed between the combustion chamber and the reaction chamber, whereby the exhaust gas is prevented from flowing into the reaction chamber and the object equivalent to the first object is accomplished with a very simple construction.

Still another object of the present invention is to provide an exhaust gas purifying device for an internal combustion engine in which the foregoing air flow preventing means is composed of means for making air flow eject into the reaction chamber through the central portion of the swirling air flow in the combustion chamber and a blocking wall member having a minimum size of opening required to let the combustion flame blow into the reaction chamber from the combustion chamber and to make the air flow ejected into the reaction chamber flow back to the combustion chamber, whereby the exhaust gas is prevented from flowing into the reaction chamber by means of the blocking wall member and a part of the flame blowing into the reaction chamber from the combustion chamber in an annular shape is positively directed back to the combustion chamber to accelerate the atomization of the fuel, and the object similar to the above objects is accomplished.

A still further object of the present invention is to provide an exhaust gas purifying device for an internal combustion engine in which the foregoing air flow preventing means is composed of a pipe introduced into the reaction chamber and having an open end located at the position where an opening is required to make the combustion flame blow into the reaction chamber from the combustion chamber, and air is ejected into the central portion of the swirl flow in the combustion chamber out of the end of the pipe, whereby the exhaust gas is prevented from flowing into the reaction chamber through the pipe and the atomization of the fuel is accelerated by the heat carried by the flame of the combustion flame moved backward by the air ejected out of the pipe and by the heat which the air ejected out of the pipe derived from the exhaust gas by heat exchanging when it passes through the reaction chamber, and the object similar to the foregoing objects is accomplished.

Figure 3:
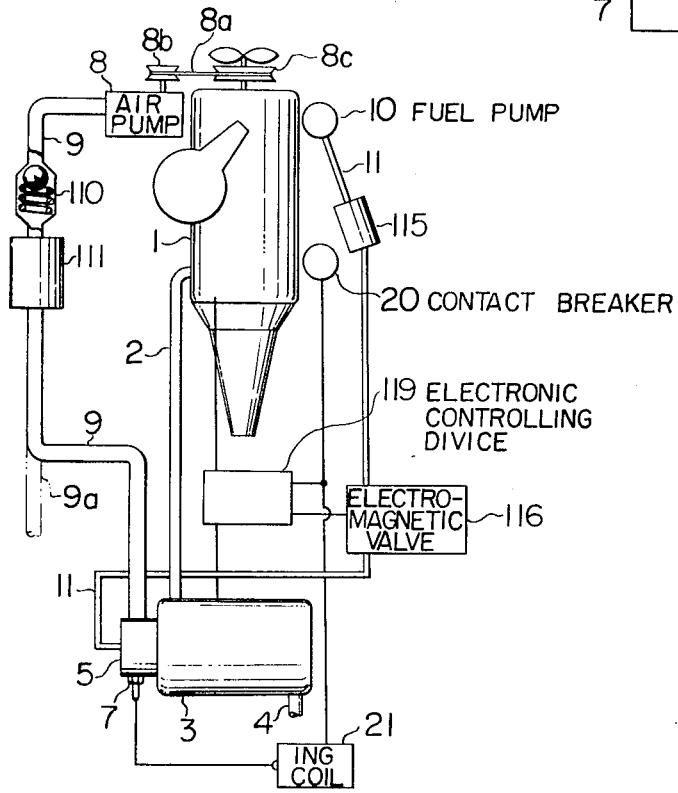
Figure 4:
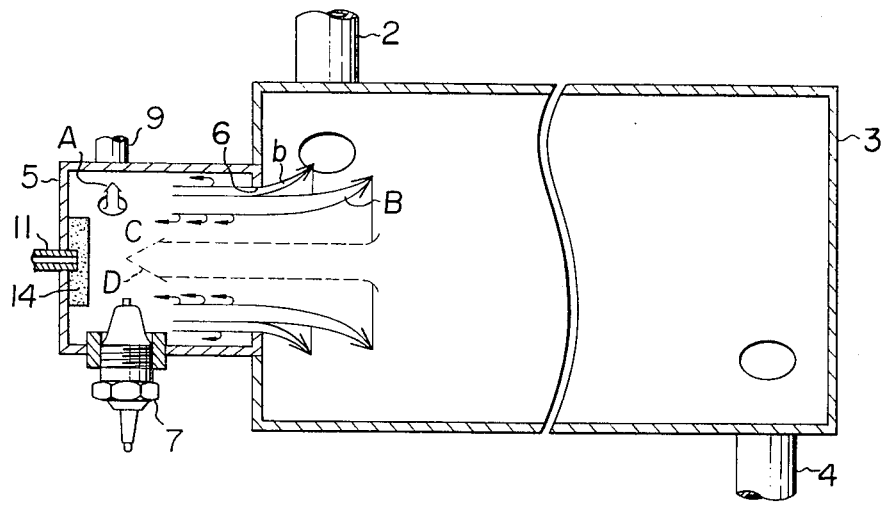
Figure 5:
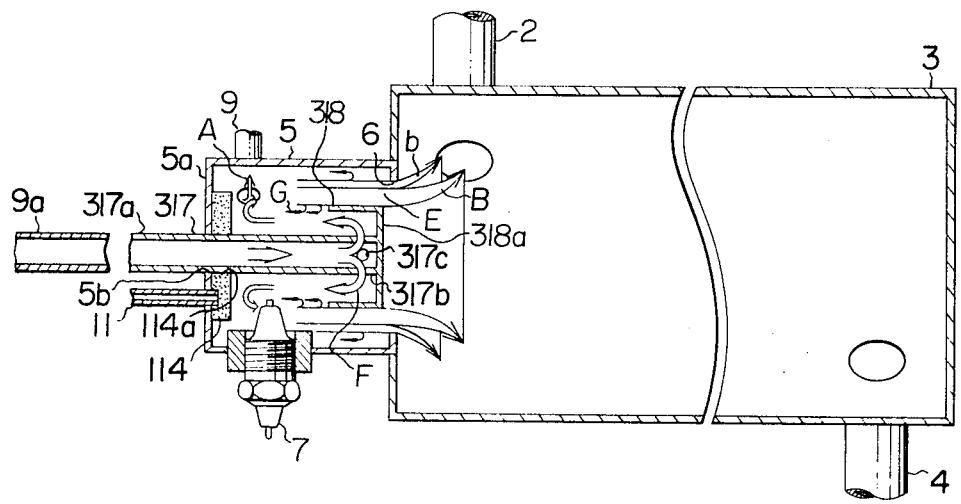
Figure 6:
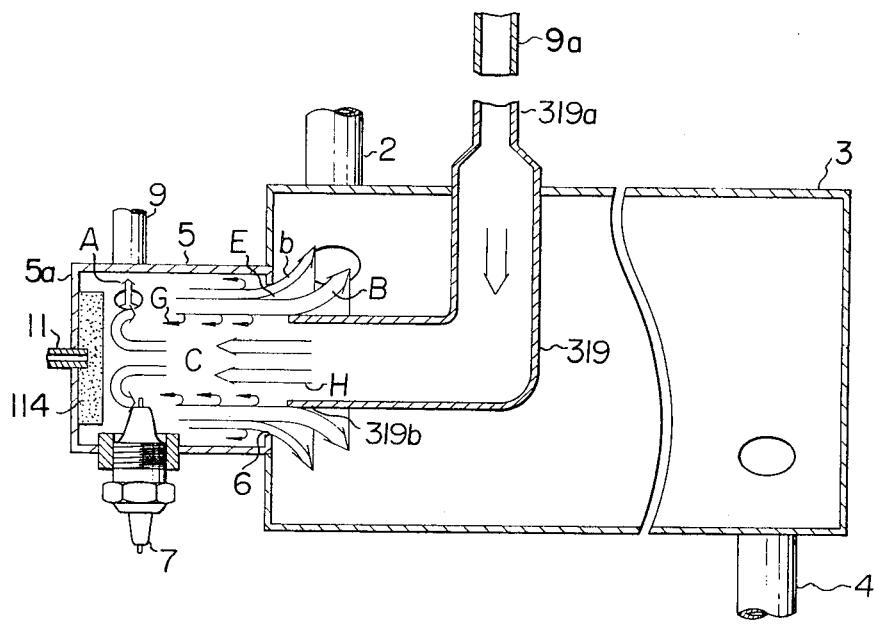
Figure 7:
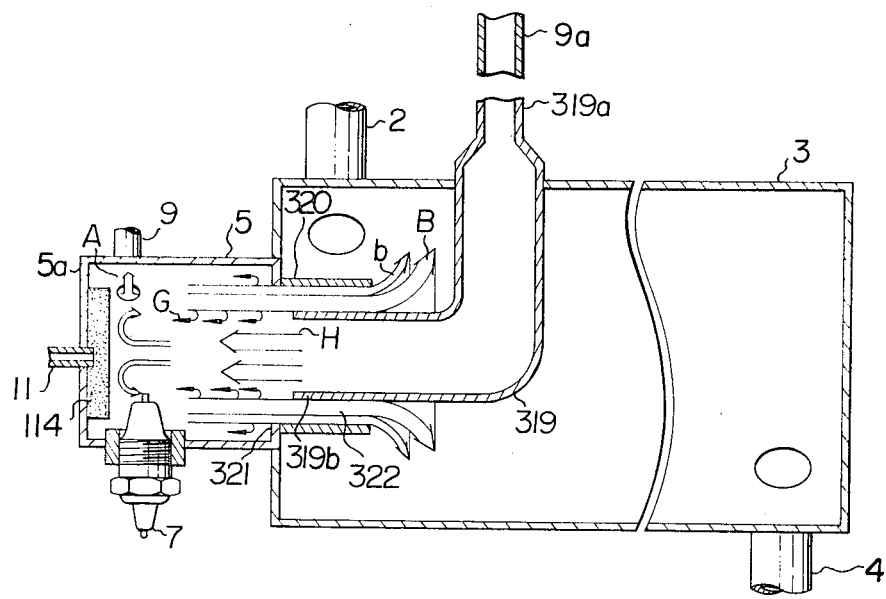

Other objects, features and advantages of the invention will be made apparent from the following description of the preferred embodiments thereof taken in conjunction with the accompanying drawing showing the embodiments in which:

FIG. 1 is a schematic view of an embodiment of the exhaust gas purifying device for an internal combustion engine in accordance with the present invention, FIG. 2 is an enlarged sectional view showing the combustion chamber and the reaction chamber of the exhaust gas purifying device in accordance with the first embodiment of the present invention, FIG. 3 is a schematic view of a second embodiment of the exhaust gas purifying device for an internal combustion engine in accordance with the present invention, FIG. 4 is an enlarged sectional view of the combustion chamber and the reaction chamber of the exhaust gas purifying device in accordance with the second embodiment of the present invention, and FIGS. 5, 6 and 7 are enlarged sectional views showing the combustion chamber and the reaction chamber of the exhaust gas purifying device in accordance with the third, fourth and fifth embodiments of the present invention.

Referring first to FIGS. 1 and 2 showing a first embodiment of the present invention, the reference numeral 1 indicates an internal combustion engine, 2 indicates an exhaust pipe, and 3 indicates a reaction chamber provided in the exhaust pipe 2 which has a prescribed volume. The reference numeral 4 indicates a discharge pipe of the reaction chamber 3, and 5 indicates a cylindrical combustion chamber formed integral with and adjacent to the foregoing reaction chamber 3. The both chambers 3 and 5 are connected with each other through an opening 6 apparently shown FIG. 2. The reference numeral 7 indicates an ignition plug projected into the combustion chamber 5 and 7a indicates a central electrode thereof. The reference numeral 8 shows an air pump driven by an engine 1 through a V-belt, and 9 shows a conduit for guiding the air from the air pump 8 to the combustion chamber 5 in which an end of the conduit 9 is opened from the tangential direction. The reference numeral 10 shows a fuel pump for example of diaphragm type which is driven by the engine 1 to supply the fuel such as gasoline in the fuel tank. The numeral 11 indicates a conduit to guide the fuel supplied by the fuel pump 10, an end of which is opened into the combustion chamber 5 from the axial direction. The reference numeral 12 indicates a convex casing which is fixed to the casing 5a of the combustion chamber 5 with the intervention of a member made of heat resisting sheet material 13 such as asbesto, glass wool, teflon, etc., by means of bisses 14 and nuts 15. The numerals 16a and 16b show sintered porous alloy members mainly composed of stainless steel. The annular alloy member 16a is disposed in the large diameter portion 12b of the convex casing 12 and the other rod-like sintered alloy member 16b is inserted into the central hole of the annular sintered alloy member 16a with a small spacing therebetween. In the small diameter portion 12c of the convex casing 12, a heating wire 17 is wound on the sintered alloy member 16b with the intervention of an insulating cylinder 18. An end of the heating wire 17 is grounded and the other end of the wire 17a is connected with a time adjusting device described hereinafter. The reference numeral 19 shows a lead wire to ground the sintered alloy member 16b so as to make the alloy member 16b serve as a grounded electrode with respect to the central electrode 7a of the ignition plug 7. An end of the conduit 11 connected with the fuel pump 10 is opened to the end portion 12d of the small diameter portion 12c of the convex casing 12. The reference numeral 20 indicates a contact breaker provided in the distributor of the engine 1 separately from the contact breaker for ignition and opened and closed by a cam following the rotation of the crank shaft of the engine 1. The numeral 21 shows an ignition coil provided separately from the ignition coil for igniting the engine 1. The circuit including the primary winding of the ignition coil 21 is intermittently broken by the contact breaker 20 to generate an intermittent direct current of high voltage in the secondary winding thereof to impress a high voltage on the ignition plug 7 to make a spark between the central electrode 7a of the ignition plug 7 and the sintered alloy member 16b. The reference numeral 22 shows a time adjusting circuit to let the direct current flow through the heating wire 17 for a prescribed duration after starting of the engine 1, for example for 20 seconds.

When the engine 1 is started in the construction as described above, the exhaust gas coming from the cylinder is concentrated in the exhaust pipe 2 and flows into the reaction chamber 3. On the other hand, air is ejected into the combustion chamber 5 along the tangential direction as shown with an arrow A in FIG. 2 from the air pump 8 through the conduit 9, and the air forms a swirl flow having a free swirl around a compulsory swirl in the combustion chamber 5. If the fuel supplied from the fuel pump 10 is introduced into the convex casing 12 through the conduit 11, the fuel first penetrates into the sintered porous alloy member 16b and then is diffused in the alloy member 16b and gradually evaporated from the surface of the rod like alloy member 16b. The fuel condensed and dropping from the sintered alloy member 16b due to the saturation in the alloy member 16b before the alloy member 16b is heated up to the temperature sufficiently high to quickly vaporize the fuel supplied thereto through the conduit 11 is absorbed by the surrounding sintered alloy member 16a adjacent thereto and diffused therein to be evaporated from the surface thereof. If the ignition plug 7 is impressed with the high voltage direct current from the ignition coil 21 under the above condition, a spark is made between the central electrode 7a and the sintered alloy member 16b and the fuel evaporated from the surface of the sintered alloy 16b is quickly ignited and exploded into combustion. The combustion flame becomes a swirl of cylindrical shape as shown at an arrow B in FIG. 2 in the compulsory swirl and blows out into the reaction chamber 3 through the opening 6. Accompanying this blow of combustion flame, excess air in the combustion chamber 5 flows into the reaction chamber 3 as shown at an arrow b in FIG. 2 and is mingled with the exhaust gas in the reaction chamber 3. The mixture of gas is ignited by the combustion flame blowing out of the opening 6 to burn the unburnt harmful component such as carbon monoxide and hydrocarbon to purify the exhaust gas. The exhaust gas thus purified is discharged out of the discharging pipe 4 and released into the atmosphere through a muffler (not shown).

When the foregoing 20 seconds lapsed since the starting of the engine, the electric current flowing through the heating wire 17 is blocked and the heating of the sintered alloy member 16b for promoting the fuel evaporation by the heating wire 17 ceases. Under this condition, the sintered alloy members 16a and 16b are heated by the heat of combustion in the combustion chamber 5 even if the heating wire 17 is not supplied with the current, and the fuel penetrating into the sintered alloy member 16b is evaporated from the surface thereof by the heat carried thereby. Further, since the evaporation of the fuel out of the sintered alloy member 16b is conducted quickly in this case, there is no possibility that the fuel should flow into the sintered alloy member 16a from the member 16b in the form of liquid.

Further, although the casing 5a is heated by the combustion in the combustion chamber 5, the heat is shielded by the asbestos 13 and will never transmit to the convex casing 12 and the vapor lock of the fuel due to the transmission of the heat to the conduit 11 is prevented.

Furthermore, although the above described embodiment has employed two sintered alloy members, it will be understood that more than two pieces of sintered alloy may be employed in combination. In addition, instead of the sintered alloy employed as the porous material, porous ceramics, porous asbestos and the like may be employed. If the material is electrically insulating in this case, the ignition plug 7 should be provided with a grounding electrode together with a central electrode 7a and a glow plug may be used as a means for igniting. Further, it will be included in the spirit of the present invention to provide a heat exchanging means in the reaction chamber 3.

Now the present invention will be described with reference to a second embodiment thereof. Referring to FIG. 3 and FIG. 4 the reference numeral 1 indicates an internal combustion engine, 2 indicates an exhaust pipe thereof, and 3 indicates a reaction chamber mounted to the exhaust pipe 2 and having a prescribed volume. The reference numeral 4 shows a discharge pipe of the reaction chamber 3, 5 shows a combustion chamber of cylindrical shape formed integral with the reaction chamber 3 adjacent thereto. The both chambers 3 and 5 are connected with an opening 6 provided therebetween. The reference numeral 7 indicates an ignition plug projected to the combustion chamber 5, 8 indicates an air pump driven by the engine 1 through a V-belt 8a and pulleys 8b and 8c, 9 indicates a conduit for guiding the air from the air pump 8 to the combustion chamber 5, 110 indicates a check valve, and 111 indicates an air volume chamber having a prescribed volume. The check valve 110 and the air volume chamber 111 are mounted in the conduit 9 with the former located nearer the air pump 8. One end of the conduit 9 is opened in the combustion chamber 5 from the tangential direction thereof. The reference numeral 10 indicates a fuel pump for example of a diaphragm type which is driven by the engine 1 to supply the fuel such as gasoline in a fuel tank (not shown). The numeral 11 designates a conduit to guide the fuel supplied by the fuel pump 10, an end of which is opened in the combustion chamber 5 from the axial direction. The reference numeral 114 shows a porous member made of noncombustible material as of sintered alloy, porous ceramics, porous asbestos and the like mounted to the open end of the conduit 113 in the combustion chamber 5 so that the fuel to be ejected out of the conduit 11 into the combustion chamber 5 may once penetrate into the porous material and then be evaporated therefrom. In the event that the porous member 114 is made of metal, the porous member 114 is able to serve also as a grounding electrode of the ignition plug 7. The reference numeral 115 designates a fuel volume chamber having a prescribed volume, and 116 shows an electromagnetic valve which is closed only when the electromagnetic coil thereof becomes conductive. The fuel volume chamber 115 and the electromagnetic valve 116 are mounted in the conduit 11. The reference numeral 20 indicates a contact breaker provided in the distributor of the engine 1 separately from the contact breaker for ignition and opened and closed in response to the rotation of the crank shaft of the engine 1. The reference numeral 21 indicates an ignition coil provided separately from the ignition coil for igniting the engine and the circuit including the primary winding of the ignition coil 21 is intermittently broken by the contact breaker 20 to generate an intermittent direct current of high voltage in the secondary winding thereof to impress a high voltage on the ignition plug 7 to make a spark periodically therein. The reference numeral 119 designates an electronic controlling device which detects the number of revolutions of the engine 1, temperature of the wall of the reaction chamber 3 and the running speed of the automobile, and stops the feed of fuel by making the electromagnetic coil of the electromagnetic valve 116 become conductive to close the electromagnetic valve 116 when it becomes unnecessary to supply the fuel to the porous member 114.

In accordance with the construction as described above, it becomes possible to keep ejecting the air remaining in the air volume chamber 111 into the combustion chamber 5 for a duration determined by the volume of the air volume chamber 111 even after the stoppage of the engine 1 and to perfectly burn the fuel remaining in the porous member 114 after the stoppage of the engine 1.

Further, if the above air volume chamber 111 is made of resilient material such as rubber for example, it is possible to supply the air within the air volume chamber 111 made of resilient material effectively into the combustion chamber 5 by the contraction of the resilient material itself after the stoppage of the engine 1.

The present invention has been described in detail with reference to a first and a second embodiments thereof. However, these embodiments sometimes suffer from the malfunction of the combustion chamber. In other words, in the above described embodiments of the present invention, at the time of normal driving, accelerating or changing speed of the engine, the combustion in the combustion chamber is affected considerably and the malfunction of the anticipated exhaust gas purification results. In particular, it is a great problem for such a kind of purifying device that the function of the exhaust gas purification is affected at the time of acceleration and changing speed when a large amount of harmful unburnt component is contained in the exhaust gas.

Through the search of the inventors made to solve this problem, a fact as follows which seems to lead the above malfunction of the device has been discovered. First, at the time of normal driving, a negative pressure appears at the central portion C of the swirling combustion flame in the combustion chamber 5 (FIG. 4) and the exhaust gas in the reaction chamber 3 flows into the central portion C of the combustion flame in the combustion chamber 5 through the opening 6 as indicated at an arrow D in FIG. 4 because of the negative pressure, which results in abnormal air-fuel ratio in the central portion of the combustion flame. Second, since the fluctuation in the exhaust pressure of the exhaust gas is large at the time of acceleration and changing speed, the exhaust pressure in the reaction chamber 3 directly affects the air in the combustion chamber, which results in malfunction of the combustion chamber.

In view of the problem and disadvantages explained just hereinabove inherent in the above described embodiments of the present invention, in the embodiments of the invention as described hereinbelow means is provided for preventing the flow of the exhaust gas from the reaction chamber into the combustion chamber and influence of the exhaust pressure.

Now the third embodiment of the present invention will be described referring to FIG. 5. The reference numeral 114 indicates a porous member made of noncombustible material such as sintered alloy, porous ceramics, porous asbestos and the like mounted to the open end of a conduit 11 in the combustion chamber 5. The porous member 114 is provided for the purpose of preventing the fuel being about to eject out of the conduit 11 into the combustion chamber 5 from ejecting directly thereinto and making the fuel once penetrate into the porous member 114 and be diffused into and evaporated from the porous member 114. Further, if a metal porous alloy is used as the porous member 114, it can be made to serve also as a grounding electrode of an ignition plug 7. The reference numeral 317 indicates a conduit which is connected at an end 317a thereof with an air pump 8 via the conduit 9a as shown in FIG. 1 and FIG. 2 with a two-dotted-line and is projected at the other end 317b thereof into the combustion chamber 5 through a hole 5b provided in the casing 5a of the combustion chamber 5 and a hole 114a provided in the porous member 114. The other end 317b of the conduit 317 is provided with a plurality of small holes 317c, and further provided with a cylindrical compartment 318 fixed thereto. The compartment 318 is located in the combustion chamber 5 at a position near an opening 6, and the bottom portion 318a thereof is opposed to the opening 6 so that an annular opening E having a minimum size required for making the combustion flame blow out of the combustion chamber 5 into the reaction chamber 3 in an annular shape may be formed therebetween.

In the construction as described above, when the air is ejected out of the conduit 9 into the combustion 5 as indicated at an arrow A, the air forms a swirl composed of a compulsory swirl and a free swirl surrounding the former. If the ignition plug 7 is ignited at this time, fuel evaporated through the porous member 114 is ignited and exploded into combustion. The flame of the combustion blows into the reaction chamber 3 through the annular opening E in the compulsory swirl as indicated by an arrow B. Accompanying this blow of flame, the superfluous air in the combustion chamber 5 flows into the reaction chamber 3 as indicated at the arrow b and is mixed with the exhaust gas in the reaction chamber 3. The mixed air is burned by the flame of combustion and the unburnt harmful component in the exhaust gas is perfectly burned in this process. At this time, the mixed air of the exhaust gas in the reaction chamber 3 and the air is blocked by the compartment 318 and accordingly never flows into the combustion chamber 5, and further, the exhaust pressure in the reaction chamber 3 does not affect the air in the combustion chamber 5. Further, the air supplied into the conduit 317 from the air pump 8 is ejected out of the small hole 317c provided in the end 317b of the conduit 317 and is repulsed by the bottom 318a of the compartment 318 and directed toward the porous member 114 in the central portion in the combustion chamber as shown by the arrow F in FIG. 5, and then is mingled with the compulsory swirl being repulsed by the porous member 114. Urged by the air flow advancing in the direction indicated at the arrow F, a part of the flame of combustion is directed toward the porous member 114 as indicated at the arrow G and the evaporation of the fuel contained in the porous member 114 is accelerated by the heat of the flame.

Furthermore, by removing the compartment 318 shown in FIG. 5 and making the end of the conduit 317 opened into the combustion chamber 5 be simply opened to the opening 6, it becomes possible to prevent the mixed air of the exhaust gas and the air in the reaction chamber 3 from flowing into the combustion chamber 5 by use of the air flow ejected into the reaction chamber 3 from the conduit 317 through the opening 6 and it becomes possible to prevent the exhaust pressure in the reaction chamber 3 from affecting the air in the combustion chamber 5.

Now the fourth embodiment of the present invention will be described referring to FIG. 6, in which the elements equivalent to or similar to those shown in FIG. 5 are indicated at the same reference numerals, an end 319a of a pipe 319 is connected with an air pump 8 via the conduit 9a as shown in FIG. 1 and FIG. 3 and the other end 319b thereof is opposed to an opening 6 making an annular opening E therebetween having a minimum size required to make an annular combustion flame ejected into the reaction chamber 3 from the combustion chamber 5.

In the construction as shown in FIG. 6, similarly to the above described third embodiment, a swirl flow is formed in the combustion chamber 5 by ejecting air into the combustion chamber 5 through a conduit 9 and a swirl flow of the combustion flame blows out of the opening E into the reaction chamber 3. On the other hand, the air supplied into the pipe 319 is heated by the exhaust gas while it passes through the reaction chamber 3 and then flows into the central portion C of the combustion flame as shown at the arrow H in FIG. 6. The air flowing into the central portion C of the flame is repulsed by the porous member 114 and is mingled into the compulsory swirl. Thus, the foregoing opening E is occupied by the combustion flame blowing into the reaction chamber 3 and the other portion of the opening 6 is occupied by the air flow ejected out of the pipe 319. Accordingly, there is no space for the mixture of the exhaust gas and air in the reaction chamber 3 to flow into the combustion chamber 5 and there is no possibility that the exhaust pressure in the reaction chamber 3 should affect the air in the combustion chamber 5. A part of the flame of combustion is directed toward the porous member 114 as shown at the arrow G urged by the air flow flowing into the central portion C of the combustion flame into the combustion chamber 5 from the pipe 319 as indicated by an arrow H. By the heat carried by the flame directed to the filter and the heat derived from the exhaust gas by the air ejected out of the pipe 319 while the air passes through the reaction chamber 3 accelerate the evaporation of the fuel contained in the porous member 114.

Now the fifth embodiment of the present invention will be described referring to FIG. 7 in which the elements equivalent or similar to those shown in FIG. 6 are designated at the same reference numerals as those used in FIG. 6. The reference numeral 320 shows a cylindrical member arranged in coaxial with the end 319b of the pipe 319 and an end of the cylindrical member 320 is secured to a compartment 321 disposed between the combustion chamber 5 and the reaction chamber 3 so that a flow resistance is positively provided in the passage 322 formed between the pipe 319 and the cylindrical member 320 which is a sole passage connected between the combustion chamber 5 and the reaction chamber 3.

In the construction as shown in FIG. 7, similarly to the above described fourth embodiment, the evaporation of fuel is accelerated by directing a part of the combustion flame toward the porous member 114 by the use of an air flow ejected out of the pipe 319, as well as the exhaust gas is purified. Further, the combustion flame ejected out of the combustion chamber 5 into the reaction chamber 3 blows through the foregoing passage 322. This combustion flame is not prevented from blowing into the reaction chamber 3 by the resistance of the passage 322 since the velocity thereof is high enough to pass therethrough. Thus, the combustion flame normally contributes to the burning of the unburnt harmful component in the exhaust gas in the reaction chamber 3. On the other hand, similarly to the above fourth embodiment, there is no space for the mixture of the exhaust gas and the air in the reaction chamber 3 to flow into the combustion chamber 5. Particularly, in the fifth embodiment, the influence of the exhaust pressure in the reaction chamber 3 to the combustion chamber 5 is securely prevented by providing the foregoing passage 322 to increase the resistance in the passage between the combustion chamber 5 and the reaction chamber 3. In this case, according to the results of the experiment made by the inventors, the length of the portion of the pipe 319 and the cylindrical member 320 where they are opposed is required to be not less than 10 mm in the axial direction, and it was proved that a good result was obtained in preventing the influence of the exhaust pressure to the combustion chamber 5 by making the width of the passage 322 namely the spacing between the cylindrical member 320 and the pipe 319 as wide as 5 to 10 mm.

Furthermore, it will be understood that it is possible within the spirit of the present invention to employ a glow plug instead of the ignition plug 7 as an igniting means, to provide a heat exchanging means in the reaction chamber 3, and to make air be positively mixed into the exhaust gas flowing through the exhaust pipe 2.

What is claimed is:

1. In an exhaust gas purifying device for an internal combustion engine in which a swirl of air is formed in a combustion chamber, a fuel is supplied into the combustion chamber and burned, and a combustion flame swirling in the combustion chamber is blown into a reaction chamber disposed in an exhaust pipe of the internal combustion engine, whereby unburnt component contained in the exhaust gas flowing into the reaction chamber is burned; the improvement which comprises a porous member made of noncombustible material mounted to a fuel spouting port opened in said combustion chamber.

2. An exhaust gas purifying device for an internal combustion engine as defined in claim 1 wherein at least two pieces of said porous member are provided, one of which is mounted to the fuel spouting port opened in the combustion chamber, and the other of which is disposed around said first porous member.

3. An exhaust gas purifying device for an internal combustion engine as defined in claim 1 wherein an electric heating means for promoting the fuel evaporation is provided on said porous member.

4. An exhaust gas purifying device for an internal combustion engine as defined in claim 1 wherein said porous member is made of sintered alloy.

5. An exhaust gas purifying device for an internal combustion engine as defined in claim 1 wherein a check valve and an air volume chamber having a prescribed volume are disposed in a conduit which introduces air from an air source to said combustion chamber with said check valve located nearer the air source.

6. An exhaust gas purifying device for an internal combustion engine as defined in claim 1 wherein a means is provided for preventing the exhaust gas from flowing into said combustion chamber from said reaction chamber and for preventing the influence of the exhaust pressure.

7. An exhaust gas purifying device for an internal combustion engine as defined in claim 6 wherein said preventing means comprises means for making air be ejected into the reaction chamber through the central portion of the swirl in the combustion chamber.

8. An exhaust gas purifying device for an internal combustion engine as defined in claim 6 wherein said preventing means comprises a compartment disposed between said combustion chamber and said reaction chamber having an opening having a minimum size required to make the combustion flame be ejected therethrough from the combustion chamber to the reaction chamber.

9. An exhaust gas purifying device for an internal combustion engine as defined in claim 6 wherein said preventing means comprises means for making air be ejected into the reaction chamber through the central portion of the swirl in the combustion chamber, and a compartment disposed between said combustion chamber and the reaction chamber having an opening of minimum size required to make the combustion flame be ejected therethrough from the combustion chamber to the reaction chamber and to repulse the air ejected into the reaction chamber backward to the combustion chamber.

10. An exhaust gas purifying device for an internal combustion engine as defined in claim 6 wherein said preventing means comprises a pipe introduced into said reaction chamber, said pipe having an open end to make air be ejected therefrom into the central portion of the swirl in the combustion chamber, said open end of the pipe being located at such a position as to make an opening therearound having a minimum size to be required to make the combustion flame blow therethrough into the reaction chamber from the combustion chamber.

11. An exhaust gas cleaning device for an internal combustion engine, as defined in claim 1, wherein said porous member is made of metal which serves as a grounding electrode for an ignition plug disposed in said combustion chamber for igniting the exhaust gas.

* * * * *